Harold L. Cullings
INVENTOR.

BY Charles E. Lightfoot
ATTORNEY

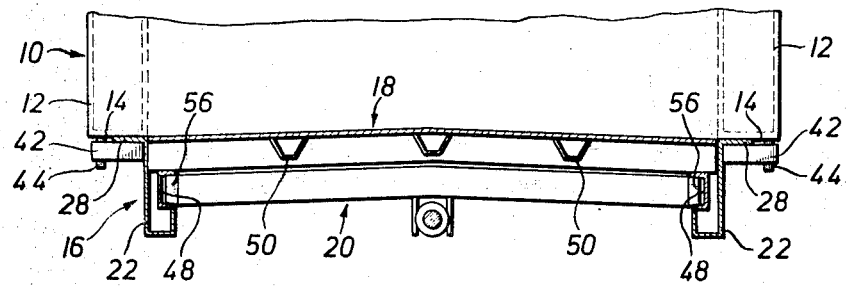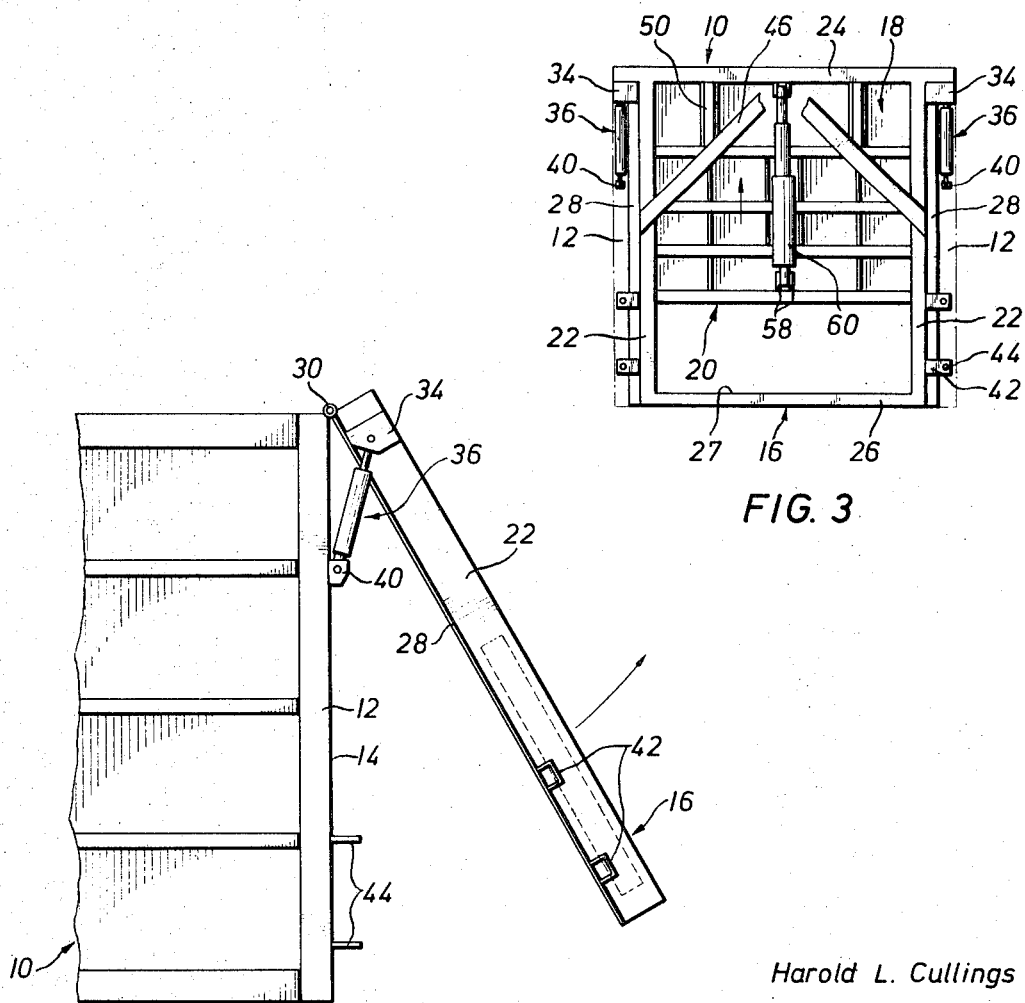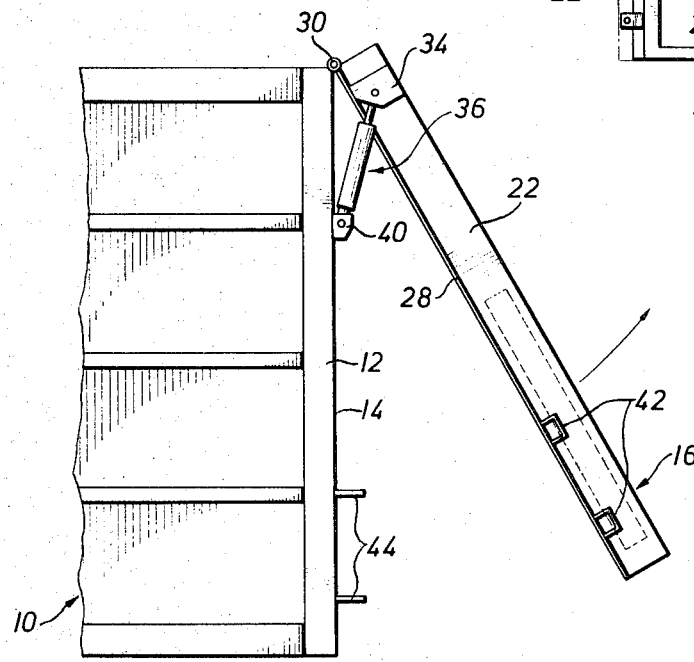

United States Patent Office 3,548,540
Patented Dec. 22, 1970

3,548,540
COMBINATION SLIDING AND SWINGING DOOR STRUCTURE FOR REFUSE VEHICLES
Harold L. Cullings, Hagerstown, Md., assignor to Pak-Mor Manufacturing Co., San Antonio, Tex., a corporation of Texas
Filed May 29, 1968, Ser. No. 733,149
Int. Cl. E05d 15/48
U.S. Cl. 49—163                 3 Claims

ABSTRACT OF THE DISCLOSURE

A combined sliding and swinging door structure for refuse vehicles of the rear loading type, or other similar vehicles, whereby such vehicles may be loaded extending the door beyond the rear end of the vehicle, but may be unloaded by fully opening the rear end of the same.

BACKGROUND OF THE INVENTION

In the collection and transportation of refuse, especially in heavily populated urban communities, transfer stations are often employed to which the refuse is hauled by local collection vehicles and where the accumulated refuse is then loaded into larger transfer vehicles to be transported to more distant disposal locations. Such transfer stations are usually provided with docking facilities or the like for the accomodation of the transporting vehicles and with loading mechanism, such as rams or packers by which the refuse may be quickly transferred into the transporting vehicles.

For the purpose of loading the transporting vehicles, in the case of vehicles of the rear loading type, it is necessary to back the vehicles up to the transfer station and provide means for guilding or confining the refuse as the same is pushed into the rear end openings of the same. Moreover, because of the tendency for the refuse to settle downwardly in the body of the transporting vehicle under the influence of gravity, or to be directed upwardly by the packer blade of the vehicle, when such mechanism is used, the uniform loading and compaction of the refuse in the vehicle is often difficult or impossible to attain, when the refuse is merely rammed into a vehicle through its fully open rear end. Under some conditions, where refuse transfer mechanism of the usual kind is employed, the transporting vehicles cannot be satisfactorily filled, so that the vehicles are moved out in a partly filled condition, thus greatly reducing the efficiency of the disposal system.

The loading of transporting vehicles in a transfer system of this kind by introducing the refuse through the fully open rear end of the vehicle, also possesses the disadvantage that the area of the opening is relatively large, requiring heavy mechanism for moving the refuse into the vehicle and making it extremely difficult to apply sufficient pressure to the refuse to fully compact the same in the vehicle.

The present invention has for an important object the provision of door mechanism for transporting vehicles of the kind referred to, by which the vehicle may be quickly and uniformly loaded, and the refuse strongly compacted therein.

Another object of the invention is to provide door mechanism for use on refuse vehicles of the rear loader type which may be operated to allow a limited area of the rear opening of the vehicle that may be used for loading the same and to permit the entire area of the opening to be used for unloading the vehicle.

A further object of the invention is the provision of a combined sliding and swinging door structure for refuse vehicles of the rear loader type slidable means for opening and closing a portion of the rear opening of the vehicle and including swingable means for opening and closing the entire area of the rear opening.

The various objects and advantages of the invention will be apparent from the following detailed description of a preferred embodiment of the same when considered with the annexed drawings.

SUMMARY OF THE INVENTION

Briefly described the door mechanism of the invention comprises an outer frame-like door portion pivotally attached to the rear end of a vehicle of the rear loader type for swinging movement into and out of closing relation thereto and inner, stationary and movable door panel portions carried in the frame, the movable panel portion being slidable to a position for coaction with the stationary panel portion to close the frame and to another position to open a portion of the area of the frame. The outer frame-like door portion is hingedly connected to the body at a location to permit the door to be swung to a position to fully open the rear end of the vehicle, and the stationary and sliding panels may be disposed to permit the opening of an upper of a lower portion of the frame for the loading of the vehicle at the level of the floor of the vehicle or at a level above the floor.

BRIEF DESCRIPTION OF THE VIEWS OF THE DRAWINGS

FIG. 2 is a horizontal cross-sectional view, taken along the line 2—2 of FIG. 1, looking in the direction indicated by the arrows and on a somewhat reduced scale;

FIG. 3 is a rear end elevational view on a greatly reduced scale, showing the inner or sliding door in an open position and the outer or swinging door in closed position; and FIG. 4 is a fragmentary, side elevational view, on a somewhat reduced scale, showing the outer or swinging door in a partially open position.

DETAILED DESCRIPTION OF A PARTICULAR EMBODIMENT OF THE INVENTION

Figure 1:
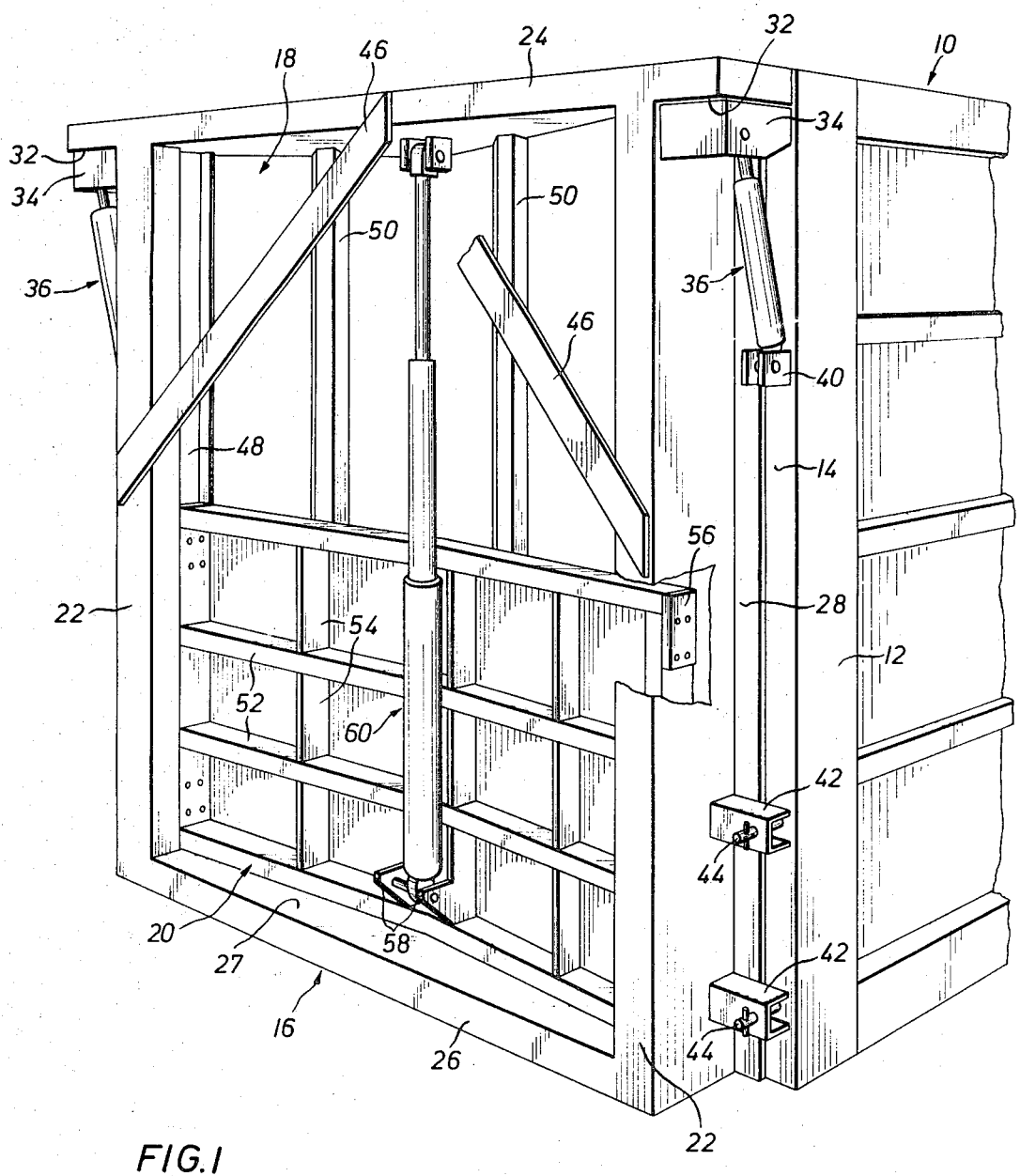
FIG. 1 is a perspective view illustrating a preferred embodiment of the invention, showing a rear end portion of a refuse vehicle with the door structure thereon and closing the rear end of the vehicle.

The invention is disclosed herein in connection with its application to a refuse vehicle having a body of a generally rectangular type adapted to be loaded and unloaded through the rear end of the vehicle body, it being understood that the combined swinging and sliding door structure is capable of use with other kinds of structures, whether stationary or portable with which it may be desirable to make use of a sliding and swinging door for similar purposes.

In the present illustration the invention is shown applied to a refuse vehicle having a rectangular body, generally designated 10 provided with a rectangular rear end opening, surrounded by a door frame having top, bottom and side frame portions, such as the upright side frame portions or posts 12 forming flat rearwardly facing abutment surfaces, such as those shown at 14 disposed in a vertical plane against which the door structure may close to completely close the opening. The vehicle may be of the type which is loaded from the sides or through a top opening, and which is provided with an internal, transversely extending, longitudinally movable packer blade for compacting and ejecting the refuse, or of some other suitable type, such as that having a tiltable body for unloading by gravity.

The door structure of the invention comprises an outer, frame-like, door portion generally designated 16, hingedly attached to the rear end of the vehicle for vertical swinging movement about a horizontal axis at the upper end of the door into and out of engagement with the rear faces of the portions of the body surrounding the door opening, and an inner door portion having a stationary panel 18 and a sliding panel 20 mounted in the frame for vertical sliding movement relative to the stationary panel.

The sides 22 and upper and lower ends 24 and 26, respectively, of the frame portion 16 of the door, may be of hollow construction, formed of sheet metal, the inner faces of the upper and lower end members of the frame being engageable with the upper and lower end face portions of the body above and below the door opening of the vehicle when the door is closed and the sides 22 being formed with laterally outwardly extending marginal portions 28 positioned for engagement with end face portions of the body outwardly of the sides of the door opening.

The upper face 27 of the lower frame portion or member 26 is preferably located to be positioned at the level of the bottom floor of the body of the vehicle when the frame is in closed position.

The frame 16 is pivotally connected to the body along the upper edge of the frame, as by means of suitable hinge means 30, shown in FIG. 4.

The upper end portion 24 of the frame is extended beyond each of the side portion 22 to the full width of the body of the vehicle to form downwardly facing shoulder portions 32, to which brackets 34 are attached to each of which one end of a cylinder assembly 36 is pivotally connected. The cylinder assemblies 36 are pivotally connected to brackets 40 attached to the door posts 12 in downwardly spaced relation to the brackets 34.

By this arrangement the cylinder assemblies 36 may be operated in a usual manner by the pressure of fluid from any suitable source of fluid under pressure to swing the door structure, as shown in FIG. 4, or to hold the same in closed position.

The frame 16 may also be provided with laterally outwardly projecting perforated lugs 42 through which pins 44 mounted on the door posts 12 are extended when the door is closed and by which the door may be latched in its closed position when desired. Other suitable door latching mechanism may, of course, be used in place of the pin and lug devices hereinabove described.

The frame 16, may also be suitably braced or reenforced as by means of the diagonal braces 46, or otherwise.

The side portions 22 of the frame are formed with inner wall portions which are shaped to provide inside, recessed track or slideways 48, best seen in FIG. 2 extending between the upper and lower end portions 24 and 26.

The inner, stationary door panel 18 may be of sheet metal construction, preferably somewhat inwardly bowed or bent and attached along its top edge to the top frame member 24 and along its side edges to the side frame members 22, as by means of welding, or the like. The stationary panel extends downwardly approximately half way from top to bottom of the frame, and may be provided with suitable reenforcing and strengthening means, such as the hollow ribs 50, formed therein or attached thereto. The stationary panel is located inwardly in the frame relative to the slideways 48.

The sliding panel 20 may take the form of a generally rectangular frame having reenforcing cross-members, such as those shown at 52 and 54, and which is of a size to close the area of the outer frame 16 below the stationary panel and to somewhat overlap the lower edge portion of the stationary panel. The sliding panel is provided along each side with slide blocks 56, or other suitable means, positioned to extend into the slideways 48 in sliding contact therewith to guide the sliding panel in its opening and closing movements. The sliding panel is also provided with outwardly projecting lugs 58 for the pivotal attachment thereto of one end of a telescoping cylinder assembly 60, whose other end is pivotally connected to the upper end member 24 of the outer frame 16. By this arrangement the sliding panel 20 may be moved vertically by operation of the cylinder assembly 60 in a usual manner, from any suitable source of fluid pressure, to slide the panel into and out of its closed position.

In the operation of the vehicle the vehicle may be moved to a transfer station, or other desired location, and positioned to receive a load to be introduced through its rear end opening, the outer door frame 16 being closed. The sliding panel 20 may then be moved upwardly to open the lower part of the frame 16 with the surface 27 at the level of the floor of the body so that the cargo may be pushed into the body.

For the purpose of loading vehicles of this kind the transfer station is usually provided with a reciprocating packer or ram, located at a suitable level, for operation to force refuse horizontally into the body through the rear opening and to compact the refuse in the body as the same is filled. When the vehicle has been thus loaded, the sliding panel 20 is lowered to closed position and the vehicle moved out of the station.

When the vehicle reaches the location where the load is to be discharged, the latching means 42 and 44 may be released and the doors swung open about the hinge means 20, as shown in FIG. 4, to allow the vehicle to be unloaded through the fully open rear end.

It will be evident that the inner door panels 18 and 20 may, if desired, be reversed, the stationary panel being positioned at the bottom portion of the frame 16, while the sliding panel is disposed to open and close the upper portion of the frame above the stationary panel, in order to permit the loading of the vehicle at a level above the floor of the same.

It will thus be seen that the invention provides door mechanism which may be operated without interferring with adjacent structures when the vehicle is positioned to be loaded through its rear end from a platform, dock, or other transfer station by the use of a ram or packer, and which also permit the full opening of the rear end of the vehicle to facilitate discharging of the load.

The invention is disclosed herein in connection with a particular embodiment of the same, which is intended to be illustrative only, it being evident that various changes can be made in the construction and arrangement of the parts.

Having thus clearly shown and described the invention, what is claimed as new and desired to secure by Letters Patent is:

1. In a combined swinging and sliding door for a structure having a door opening, a frame shaped for engagement with the structure in surrounding relation to the opening, means movably supporting the frame on the structure for swinging movement into and out of such engagement, panel means slidably mounted on the frame for movement to one position to provide an opening through the frame through the door opening and to another position to close the frame, first pressure fluid means movably connecting the frame to the structure in position for coaction therewith to impart such swinging movement to the frame, and second pressure fluid means connected between the frame and panel means in position to impart sliding movement to said panel means.

2. The combined swinging and sliding door as claimed in claim 1 wherein said second pressure fluid means includes pressure cylinder means and means for connecting the same at its opposite ends to said frame and panel means at locations in a common plane parallel to the plane of said panel means.

3. In a combined swinging and sliding door for a structure having a door opening and formed with a planar surface surrounding the opening, a frame formed with planar surface portions positioned for engagement with said planar surface, first panel means closing a portion of the area within the frame extending across the frame and from one end of the frame toward the other end thereof, second panel means movably mounted on the frame for movement into and out of closing relation to the area within the frame between said first panel means and said other end, means forming a pivotal connection between the frame and structure to allow the frame to swing toward and away from said opening, said structure having a wall portion forming a side of said opening and said frame having a surface portion forming said other end of said area and positioned to be disposed in the plane of said wall portion when the frame is in such engagement with said structure, first pressure fluid means positioned for coaction with the frame and structure to impart swinging movement to the frame, and second pressure fluid means connected between the frame and second panel means in position to impart opening movement to said second panel means.

References Cited

UNITED STATES PATENTS

| | | | |
|---|---|---|---|
| 2,174,197 | 9/1939 | Ryan | 296—51 |
| 2,212,058 | 8/1940 | Wood | 296—51UX |
| 2,787,348 | 4/1957 | Goodemote | 49—164 |
| 3,104,910 | 9/1963 | Kappen | 296—51 |
| 3,155,203 | 11/1964 | Kappen | 296—51X |

BENJAMIN HERSH, Primary Examiner

J. A. PEKAR, Assistant Examiner

U.S. Cl. X.R.

296—50